(12) United States Patent
Han (10) Patent No.: US 9,653,721 B2
(45) Date of Patent: May 16, 2017

(54) RECHARGEABLE BATTERY (71) Applicant: SAMSUNG SDI CO., LTD., Yongin-si, Gyeonggi-do (KR)

(72) Inventor: Min-Yeol Han, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 412 days.

(21) Appl. No.: 14/246,584

(22) Filed: Apr. 7, 2014

(65) Prior Publication Data

US 2015/0072221 A1    Mar. 12, 2015

(30) Foreign Application Priority Data

Sep. 12, 2013    (KR) .......................... 10-2013-0109962

(51) Int. Cl.
*H01M 2/30* (2006.01)
*H01M 2/04* (2006.01)
(Continued)

(52) U.S. Cl.
CPC ............... *H01M 2/30* (2013.01); *H01M 2/34* (2013.01); *H01M 2/0217* (2013.01); *H01M 2/04* (2013.01); *H01M 2/0473* (2013.01); *H01M 2/347* (2013.01); *H01M 2/348* (2013.01); *H01M 2200/00* (2013.01); *H01M 2200/103* (2013.01); *H01M 2200/106* (2013.01); *H01M 2200/108* (2013.01)

(58) Field of Classification Search
None
See application file for complete search history.

(56) References Cited

U.S. PATENT DOCUMENTS

2011/0081572 A1*  4/2011  Byun ....................... H01M 2/26
                                                         429/178
2011/0136002 A1   6/2011  Cho et al.
(Continued)

FOREIGN PATENT DOCUMENTS

JP    2005-149794 A    6/2005
JP    2009-064630 A    3/2009
(Continued)

OTHER PUBLICATIONS

Korean Office Action dated Jul. 12, 2016 in Corresponding Korean Patent Application No. 10-2013-0109962.
(Continued)

*Primary Examiner* — Ula C Ruddock
*Assistant Examiner* — Matthew Van Oudenaren
(74) *Attorney, Agent, or Firm* — Lee & Morse, P.C.

(57) ABSTRACT

A rechargeable battery including an electrode assembly including a separator, and a negative electrode and a positive electrode provided on opposite surfaces of the separator; a case accommodating the electrode assembly therein; a cap plate coupled to the case; a negative electrode terminal and a positive electrode terminal respectively connected to the negative electrode and the positive electrode, the negative electrode terminal and positive electrode terminal extending through a terminal hole of the cap plate; a safety member between the electrode assembly and the case; and a first resistance member connecting the safety member with the negative electrode.

13 Claims, 7 Drawing Sheets

(51) Int. Cl.
H01M 2/02 (2006.01)
H01M 2/34 (2006.01)

(56) References Cited

U.S. PATENT DOCUMENTS

| | | | |
|---|---|---|---|
| 2011/0136004 A1* | 6/2011 | Kwak | H01M 2/024 |
| | | | 429/186 |
| 2011/0183165 A1* | 7/2011 | Byun | H01M 2/0202 |
| | | | 429/61 |
| 2012/0141845 A1 | 6/2012 | Byun et al. | |
| 2012/0225333 A1* | 9/2012 | Kim | H01M 2/021 |
| | | | 429/61 |
| 2013/0149570 A1 | 6/2013 | Han et al. | |

FOREIGN PATENT DOCUMENTS

| | | |
|---|---|---|
| KR | 10-1116501 B1 | 2/2012 |
| KR | 10-2012-0060724 A | 6/2012 |
| KR | 10-2012-0099919 A | 9/2012 |
| KR | 10-2013-0065575 A | 6/2013 |

OTHER PUBLICATIONS

Notice of Allowance dated Jan. 23, 2017 of the corresponding Korean Patent Application No. 10-2013-0109962.

* cited by examiner

RECHARGEABLE BATTERY

CROSS-REFERENCE TO RELATED APPLICATION

Korean Patent Application No. 10-2013-0109962, filed on Sep. 12, 2013, in the Korean Intellectual Property Office, and entitled: "Rechargeable Battery," is incorporated by reference herein in its entirety.

BACKGROUND

1. Field

Embodiments relate to a rechargeable battery

2. Description of the Related Art

A rechargeable battery is a battery that can be repeatedly charged and discharged, unlike a primary battery. A low-capacity rechargeable battery may be used for small portable electronic devices such as a mobile phone, a notebook computer, and a camcorder. A large-capacity rechargeable battery may be used as a power supply for driving a motor such as for a hybrid car.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly including a separator, and a negative electrode and a positive electrode provided on opposite surfaces of the separator; a case accommodating the electrode assembly therein; a cap plate coupled to the case; a negative electrode terminal and a positive electrode terminal respectively connected to the negative electrode and the positive electrode, the negative electrode terminal and positive electrode terminal extending through a terminal hole of the cap plate; a safety member between the electrode assembly and the case; and a first resistance member connecting the safety member with the negative electrode.

The rechargeable battery may further include an insulation member, wherein the safety member includes a plate portion on a flat side surface of the electrode assembly, the insulation member being on the plate portion, and a protrusion that protrudes from the plate portion and is connected to the first resistance member.

The protrusion may protrude from the plate portion at a region that is closer to the positive electrode terminal than the negative electrode terminal.

The first resistance member may have a band shape and is spaced apart from the plate portion, a first end of the first resistance member being connected to the protrusion and a second end of the first resistance member being connected to a negative electrode lead tab that is connected to the negative electrode.

The first resistance member may be vertically between the electrode assembly and the cap plate.

The first resistance member may include a pair of first sub-resistance members, one of the first sub-resistance members being vertically between the electrode assembly and the cap plate, and the other of the first sub-resistance members being vertically between the electrode assembly and a bottom of the case.

The safety member may include a pair of the protrusions, one of the protrusions protruding upwardly from the plate portion and being connected to the one of the pair of first sub-resistance members, and the other of the protrusions protruding downwardly from the plate portion and being connected to the other of the pair of first sub-resistance members.

The first resistance member may have a bent shape, may be separate from the plate portion, and may have a first end connected to the protrusion and a second end connected to a negative electrode lead tab, the negative electrode lead tab being connected to the negative electrode.

The rechargeable battery may further include a second resistance member connecting the positive electrode terminal with the cap plate.

The positive electrode terminal may include a rivet terminal in the terminal hole of the cap plate; a widely-formed flange inside the cap plate and integrated with the rivet terminal; and a plate terminal outside of and insulated from the cap plate, the plate terminal being electrically connected to the rivet terminal.

The plate terminal may include a through hole into which the rivet terminal is inserted, and a connection portion protruding from a side thereof, the connection portion being connected to the second resistance member.

The second resistance member may have a plate shape and includes a pair of through holes at opposite sides thereof, a first one of the through holes may be on a first mounting member that protrudes from the connection portion, and a second one of the through holes may be on a second mounting member that protrudes from the cap plate.

Each of the first mounting member and the second mounting member may have threads at an end portion thereof, the second resistance member being mounted on the first mounting member and the second mounting member and being fastened to the first mounting member and the second mounting member by a nut.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
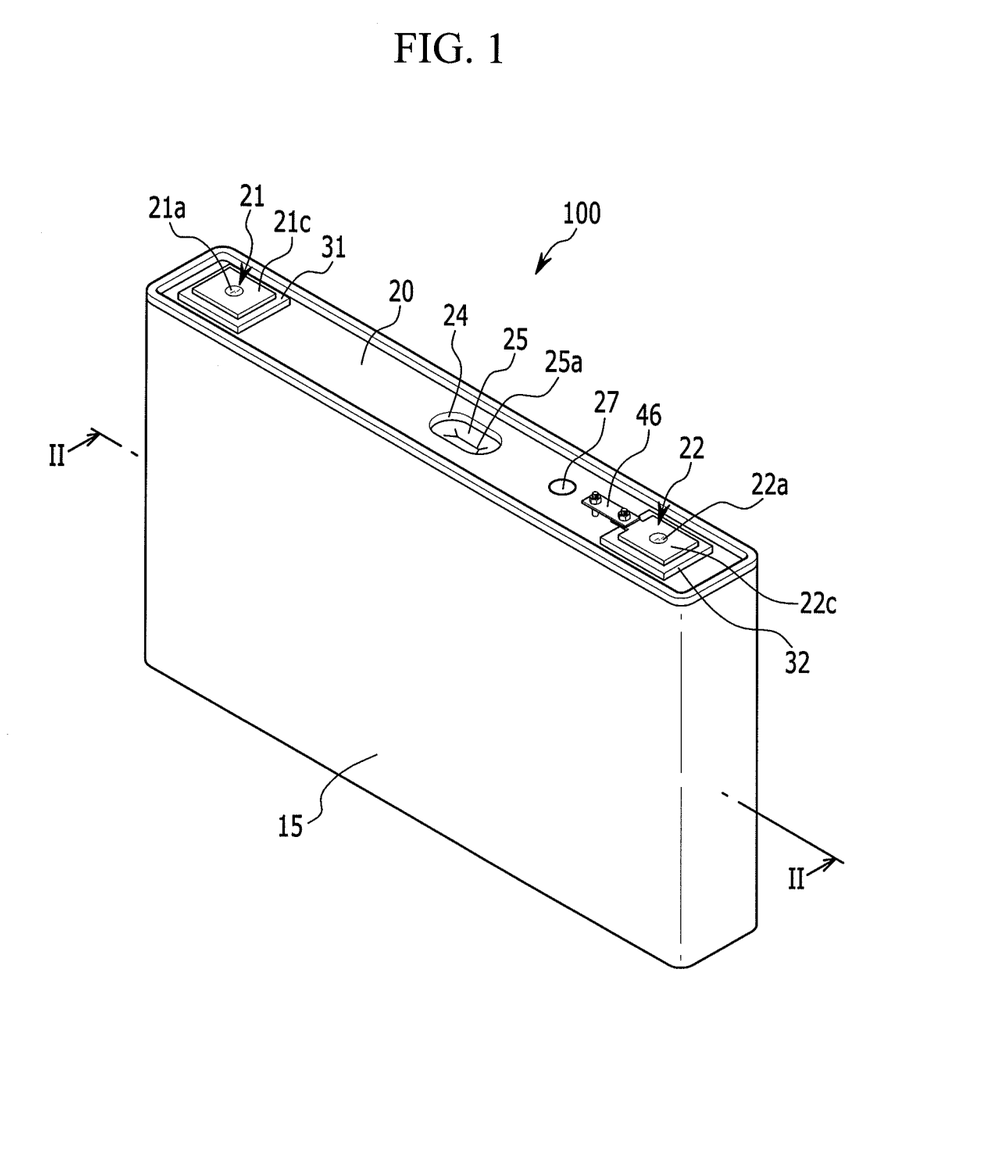
FIG. 1 illustrates a perspective view of a rechargeable battery in accordance with a first exemplary embodiment.
Figure 2:
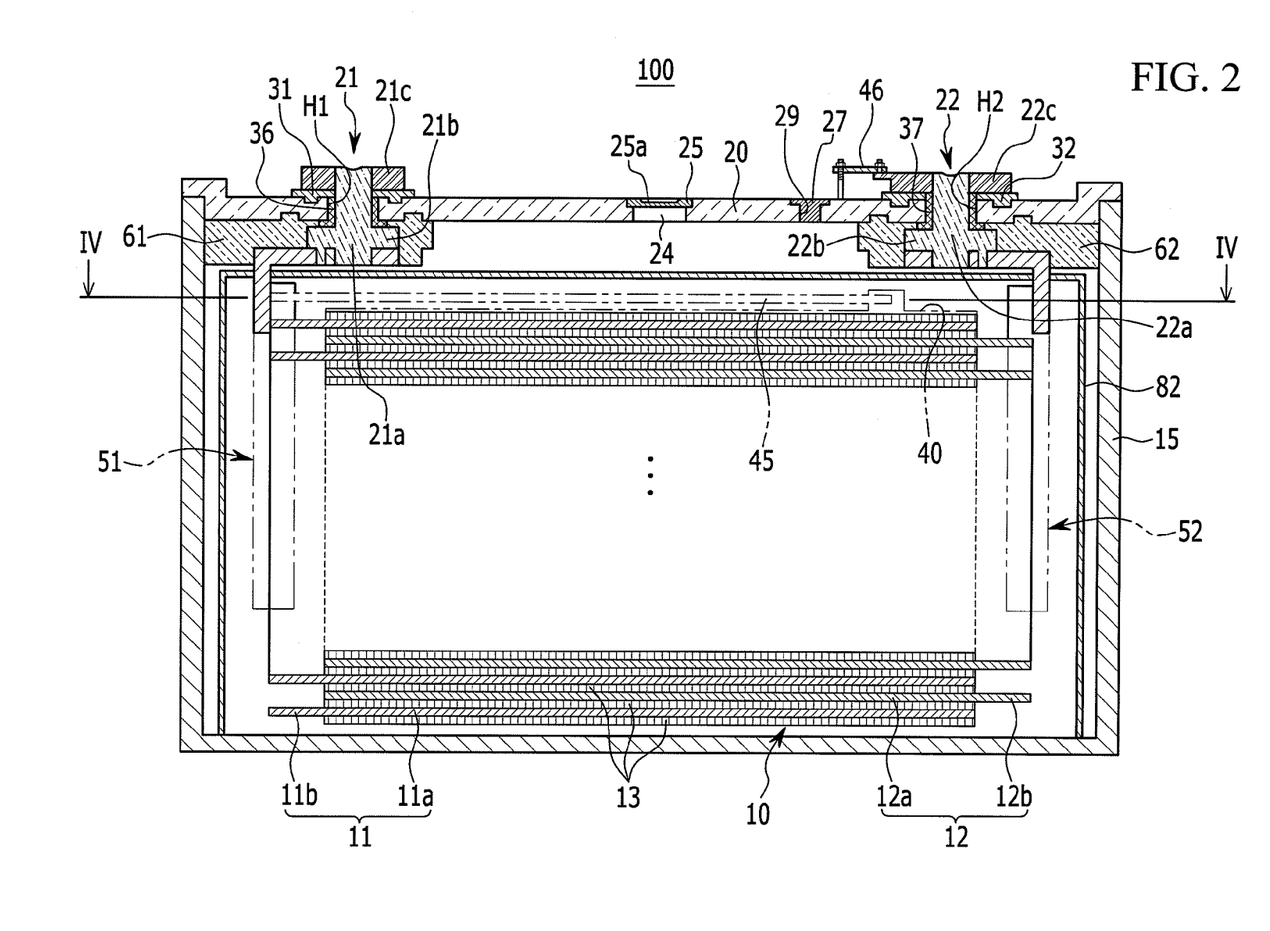
FIG. 2 illustrates a cross-sectional view of the rechargeable battery taken along a line II-II of FIG. 1.

FIG. 1 illustrates a perspective view of a rechargeable battery in accordance with a first exemplary embodiment, and FIG. 2 illustrates a cross-sectional view of the rechargeable battery taken along a line II-II of FIG. 1. Referring to FIG. 1 and FIG. 2, the rechargeable battery 100 of the first exemplary embodiment may include an electrode assembly 10, a case 15, a cap plate 20, a negative electrode terminal 21, a positive electrode terminal 22, a safety member 40, and first and second resistance members 45 and 46.

The electrode assembly 10 may charge and discharge a current, the case 15 may accommodate the electrode assembly 10, the cap plate 20 may be coupled to an opening of the case 15, the negative electrode terminal 21 and the positive electrode terminal 22 may be installed in the cap plate 20 and may be connected to the electrode assembly 10, the safety member 40 may be between the electrode assembly 10 and the case 15, and the first resistance member 45 may electrically connect the safety member 40 to the electrode assembly 10.

For example, the electrode assembly 10 may be formed by disposing a negative electrode 11 and a positive electrode 12 on opposite surfaces of a separator 13 (serving as an insulator), and winding the negative electrode 11, the separator 13, and the positive electrode 12 in a jelly-roll shape. The negative and positive electrodes 11 and 12 may include coated regions 11a and 12a (formed by applying an active material to a current collector of a metal plate) and uncoated regions 11b and 12b (which are exposed portions of the current collector to which the active material is not applied).

The uncoated region 11b of the negative electrode 11 may be formed at one end of the negative electrode 11 along the wound negative electrode 11. The uncoated region 12b of the positive electrode 12 may be formed at one end of the positive electrode 12 along the wound positive electrode 12. The uncoated regions 11b and 12b of the negative electrode 11 and the positive electrode 12 may be respectively disposed at opposite ends of the electrode assembly 10.

For example, the case 15 may have a substantially cubic or cuboid shape to form a space for receiving the electrode assembly 10 and an electrolyte solution, and an opening connecting an inner space to the outside may be formed on one surface of the cuboid. The opening facilitates insertion of the electrode assembly 10 into the case 15.

The cap plate 20 may be mounted at the opening of the case 15 to close and seal the case 15. In an implementation, the case 15 and the cap plate 20 may be formed of aluminum so as to be welded to each other.

The cap plate 20 may include an electrolyte injection opening 29, a vent hole 24, and terminal holes H1 and H2. After the cap plate 20 is coupled with the case 15, the electrolyte injection opening 29 may be used to inject the electrolyte solution into the case 15. After the electrolyte solution is injected, the electrolyte injection opening 29 may be sealed by a sealing stopper 27.

The vent hole 24 may be closed and sealed with a vent plate 25 so that internal pressure of the rechargeable battery 100 may be discharged. If the internal pressure of the rechargeable battery 100 reaches a predetermined pressure, the vent plate 25 may be ruptured to open the vent hole 24. The vent plate 25 may include a notch 25a for inducing or facilitating the rupture.

The negative electrode terminal 21 and the positive electrode terminal 22 may be mounted in the terminal holes H1 and H2 of the cap plate 20 and may be electrically connected to the electrode assembly 10. For example, the negative electrode terminal 21 may be electrically connected to the negative electrode 11 of the electrode assembly 10, and the positive electrode terminal 22 may be electrically connected to the positive electrode 12 of the electrode assembly 10. Accordingly, the electrode assembly 10 may be drawn outside the case 15 through the negative electrode terminal 21 and the positive electrode terminal 22.

The negative and positive electrode terminals 21 and 22 may respectively include rivet terminals 21a and 22a (mounted in the terminal holes H1 and H2 of the cap plate 20), flanges 21b and 22b (integrally and widely formed in the rivet terminals 21a and 22a at an inner side of the cap plate 20), and plate terminals 21c and 22c (electrically connected to the rivet terminals 21a and 22a that are disposed at the outer side of the cap plate 20 through riveting or welding).

Insulation members 31 and 32 of the negative electrode terminal 21 and the positive electrode terminal 22 may be respectively mounted between the short-circuit tab 41 and the cap plate 20 to electrically insulate the plate terminals 21c and 22c from the cap plate 20. For example, the cap plate 20 may maintain a state of electrical insulation from the negative electrode terminal 21 and the positive electrode terminal 22.

For example, the insulation members 31 and 32 may be respectively provided between the plate terminals 21c and 22c and the cap plate 20, while extending through the rivet terminals 21a and 22a. Accordingly, the insulation members 31 and 32 and the plate terminals 21c and 22c may be respectively coupled to upper ends of the rivet terminals 21a and 22a by coupling the insulation members 31 and 32 and the plate terminals 21c and 22c to the upper ends of the rivet terminals 21a and 22a to caulk or weld the upper ends thereof.

Negative and positive electrode gaskets 36 and 37 may be respectively disposed between the rivet terminals 21a and 22a of the negative and positive electrode terminals 21 and 22 and the inner surfaces of the terminal holes H1 and H2 of the cap plate 20, to seal and electrically insulate between the rivet terminals 21a and 22a and the cap plate 20.

The negative and positive electrode gaskets 36 and 37 may be or may extend between the rivet terminals 21b and 22b and the insulation members 31 and 32, respectively. For example, the negative and positive electrode gaskets 36 and 37 may respectively provide a better seal and may electrically insulate between the rivet terminals 21a and 22a and the insulation members 31 and 32.

The negative and positive electrode gaskets 36 and 37 may be or may extend between the flanges 21b and 22b and an inner surface of the cap plate 20 to better seal and electrically insulate between the flanges 21b and 22b and the cap plate 20. The negative and positive electrode gaskets 36 and 37 may respectively allow the negative and positive electrode terminals 21 and 22 to be mounted on the cap plate 20 to help prevent the electrolyte from leaking through the terminal holes H1 and H2.

Negative and positive lead tabs 51 and 52 may respectively electrically connect the negative and positive electrode terminals 21 and 22 to the negative and positive electrodes 11 and 12 of the electrode assembly 10. The negative and positive lead tabs 51 and 52 may be respectively connected to the lower ends of the rivet terminals 21a and 22a while being supported by the flanges 21b and 22b, by coupling the lead tabs 51 and 52 to the lower ends of the rivet terminals 21a and 22a to caulk or weld the lower ends thereof.

Negative and positive insulating members 61 and 62 may be respectively mounted between the negative and positive lead tabs 51 and 52 and the cap plate 20 to electrically insulate the negative and positive lead tabs 51 and 52 from the cap plate 20. In addition, one of each of the negative and positive insulating members 61 and 62 may be coupled to the cap plate 20, and the other thereof may surround the negative and positive lead tabs 51 and 52, the rivet terminals 21a and 22a, and the flanges 21b and 22b, thereby stabilizing the connection structure thereof.

The safety member 40 may be between the electrode assembly 10 and an internal surface of the case 15. The first resistance member 45 may electrically connect the safety member 40 to the negative electrode 11 of the electrode assembly 10 to negatively electrify the safety member 40 (see FIG. 2), e.g., to provide the safety member 40 with the same polarity as the negative electrode 11. The second resistance member 46 may electrically connect the positive electrode terminal 22 to the cap plate 20 to positively electrify the cap plate 20 and the case 15 (see FIG. 1), e.g., to provide the cap plate 20 and the case 15 with the same polarity as the positive electrode terminal 22.

Figure 3:
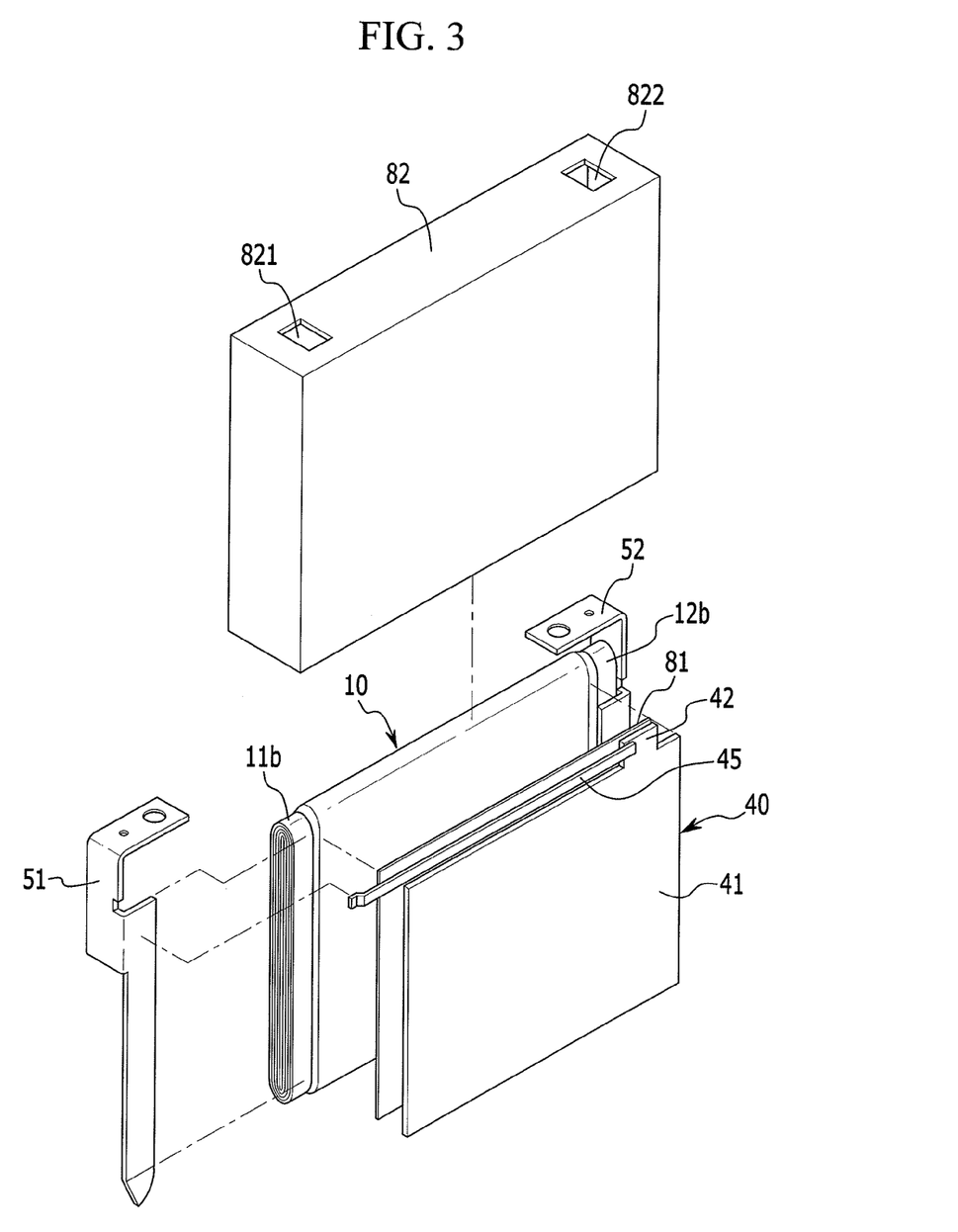
FIG. 3 illustrates an exploded perspective view showing an electrode assembly, first and second insulation members, a safety member, and positive and negative electrode lead tabs.
Figure 4:
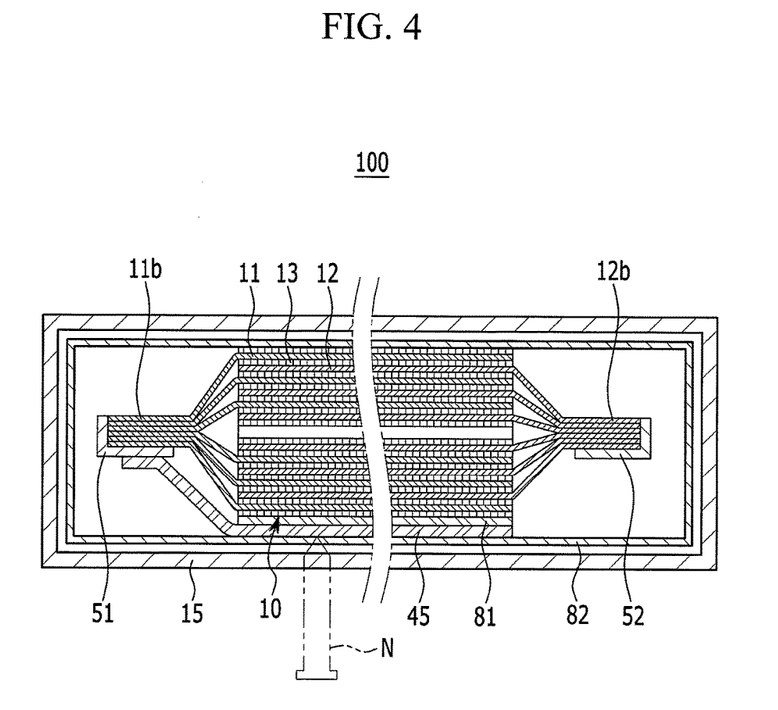
FIG. 4 illustrates a cross-sectional view of the rechargeable battery taken along a line IV-IV of FIG. 2.

FIG. 3 illustrates an exploded perspective view showing an electrode assembly, first and second insulation members, a safety member, and positive and negative electrode lead tabs. FIG. 4 illustrates a cross-sectional view of the rechargeable battery taken along a line IV-IV of FIG. 2.

Referring to FIG. 3 and FIG. 4, in the rechargeable battery 100 of the first exemplary embodiment, the safety member 40 may be made of a conductive metal and may have an insulation structure between the electrode assembly 10 and the case 15, e.g., may be insulated from the electrode assembly 10 and the case 15. In order to insulate the safety member 40 from the electrode assembly 10 and the case 15, a first insulation member 81 and a second insulation member 82 may be disposed on opposite surfaces of the safety member 40.

In the first exemplary embodiment, the safety member 40 may be between a side of the electrode assembly 10 and the internal surface of the case 15, to deal with penetration of a conductor N at a side of the rechargeable battery 100. Although not shown, safety members may be respectively disposed between opposite sides, e.g., either side, of the electrode assembly and the internal surface of the case, to deal with penetration of a conductor N at opposite sides, e.g., either side, of the rechargeable battery 100.

For example, the safety member 40 may have a plate portion 41 on a flat side surface of the electrode assembly 10, and the first insulation member 81 may be on the plate portion 41. For example, the first insulation member 81 may be between the electrode assembly 10 and the plate portion 41. A protrusion 42 may protrude from the plate portion 41 and may be connected to, e.g., electrically connected to, the first resistance member 45.

The plate portion 41 may be short-circuited to the case 15 through the conductor N (that penetrates from outside the electrode assembly 10) before an internal short circuit occurs in the electrode assembly 10 due to penetration by the conductor N For example, the plate portion 41 may be electrically connected to the negative electrode 11 of the electrode assembly 10 to thus be negatively electrified (e.g., to have the same polarity as the negative electrode 11, and the case 15 may be positively electrified (e.g., to have the same polarity as the positive electrode 12). Thus, if the conductor N penetrates, the conductor N may electrically connect the case (positive polarity) with the negative electrode (negative polarity).

For example, the first resistance member 45 may have a band shape and may be disposed separately from, e.g., separated or spaced apart from, the plate portion 41. The first resistance member 45 may have a first end thereof connected to, e.g., electrically connected to, the protrusion 42, and may have a second end thereof connected to, e.g., electrically connected to, the negative electrode lead tab 51 (that is electrically connected to the negative electrode 11). Accordingly, the first resistance member 45 may set a resistance between the electrode assembly 10 and the cap plate 20 and may also set a relevant current value.

In an implementation, the protrusion 42 may be on the plate portion 41 adjacent to a side of the positive electrode terminal 22. For example, the protrusion 42 may be formed as far away as possible from the negative electrode terminal 21, to help increase a length of the first resistance member 45, e.g., to be as long as possible. Accordingly, the first resistance member 45 may precisely set the resistance and also set a current value discharged from the first resistance member 45 if a conductor N penetrates the rechargeable battery 100.

For example, a conductor N may penetrate the case 15, and may then penetrate the electrode assembly 10 when the conductor N penetrates the rechargeable battery 100. In this case, the safety member 40 (between the case 15 and the electrode assembly 10) may be short-circuited to the case 15 through the conductor N outside the electrode assembly 10 before a short-circuit is generated inside the electrode assembly 10.

A voltage charged to the electrode assembly 10 may be quickly discharged outside the electrode assembly 10 through the case 15, the conductor N, and the safety member 40. In this case, the first resistance member 45 may set a current value between the negative electrode 11 of the electrode assembly 10 and the plate portion 41 by using the set resistance.

The first insulation member 81 may be between the electrode assembly 10 and the safety member 40 to accomplish an insulation structure, e.g., to insulate between the electrode assembly 10 and the safety member 40. The second insulation member 82 may be between the safety member 40 and the case 15 to accomplish an insulation structure, e.g., to insulate between the safety member 40 and the case 15. An upper end of the second insulation member 82 may be closed to further insulate between the upper end of the safety member 40 and the cap plate 20. Outlets 821 and 822 (through which the negative and positive electrode lead tabs 51 and 52 are respectively drawn out) may be formed at the upper end of the second insulation member 82.

Figure 5:
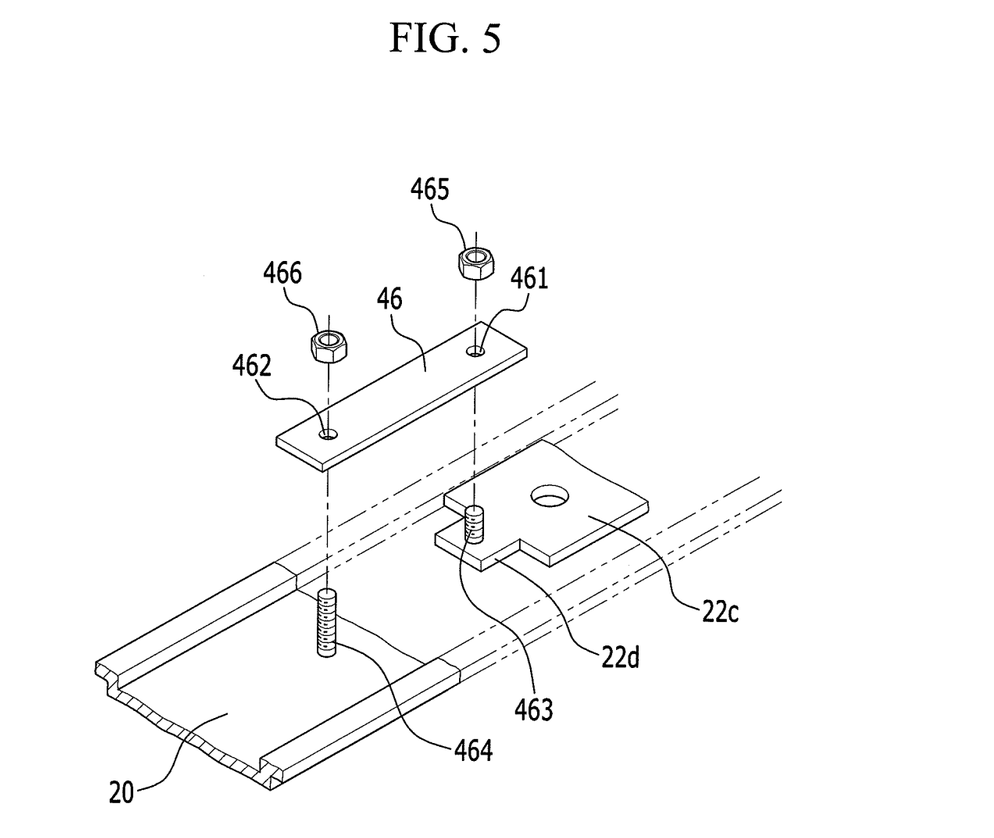
FIG. 5 illustrates an exploded perspective view showing a structure in which a cap plate and a positive electrode terminal are electrically connected to each other.

FIG. 5 illustrates an exploded perspective view showing a structure in which a cap plate and a positive electrode terminal are electrically connected to each other. Referring to FIG. 5, FIG. 1, and FIG. 2, in the positive electrode terminal 22, the plate terminal 22c may further include a connection portion 22d protruded from a side thereof and connected to, e.g., electrically connected to, the second resistance member 46.

The second resistance member 46 may have a plate shape. A pair of through holes 461 and 462 may be formed in the second resistance member 46. In the second resistance member 46, one through hole 461 may correspond with or may be on a first mounting member 463 (that protrudes from the connection portion 22d), and the other through hole 462 may correspond with or may be on a second mounting member 464 (that protrudes from the cap plate 20).

For example, threads may be formed at end portions of the first mounting member 463 and the second mounting member 464. The second resistance member 46 may be fixed by respectively mounting the first and second mounting members 463 and 464 in the through holes 461 and 462, and fastening nuts 465 and 466 to the threads. As a result, the second resistance member 46 may set a resistance between the positive electrode terminal 22 and the cap plate 20 and may also set a relevant current value.

For example, if the conductor N penetrates the rechargeable battery 100, the safety member 40 may be short-circuited to the case 15 through the conductor N outside of the electrode assembly 10 before a short-circuit may be generated inside the electrode assembly 10. A voltage charged to the electrode assembly 10 may be quickly discharged outside the electrode assembly 10 through the case 15, the conductor N, and the safety member 40. In this case, in addition to the action of the first resistance member 45, the second resistance member 46 may set a current value between the positive electrode terminal 22, the cap plate 20, and the case 15 by using the set resistance.

Next, various exemplary embodiments of methods for manufacturing the cover window will be described. The same constitutions of the first exemplary embodiment and the above-described exemplary embodiment may be omitted, and different constitutions may be described.

Figure 6:
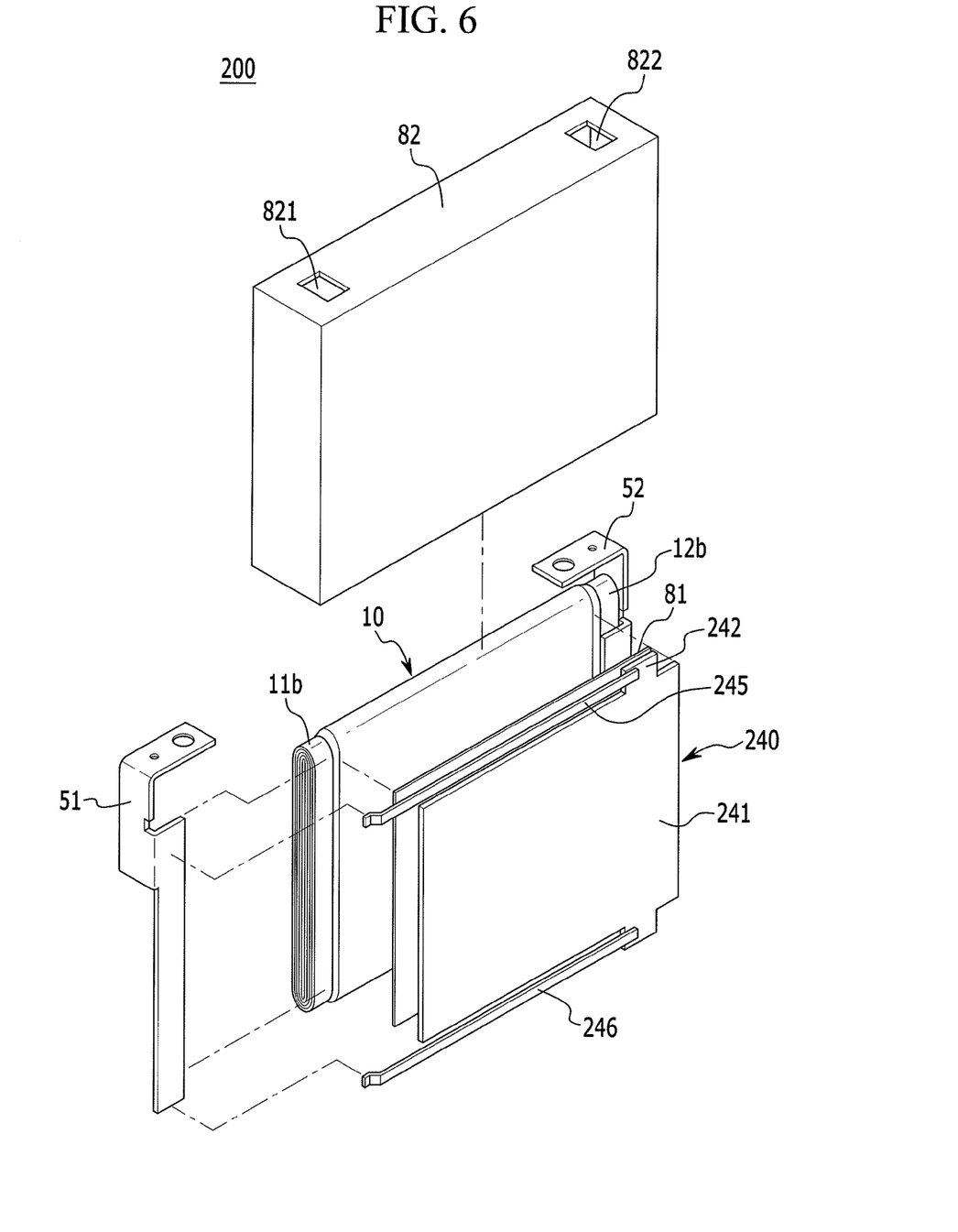
FIG. 6 illustrates an exploded perspective view showing an electrode assembly, first and second insulation members, a safety member, and positive and negative electrode lead tabs in a rechargeable battery in accordance with a second exemplary embodiment.

FIG. 6 illustrates an exploded perspective view showing an electrode assembly 10, first and second insulation members 81 and 82, a safety member 240, and negative and positive electrode lead tabs 51 and 52 in a rechargeable battery 200 in accordance with a second exemplary embodiment.

Referring to FIG. 6, in the rechargeable battery 200 in accordance with the second exemplary embodiment, a pair of first sub-resistance members 245 and 246 may be provided. For example, the first sub-resistance members 245 and 246 may be respectively disposed between, e.g., vertically between, the electrode assembly 10 and the cap plate 20 and between, e.g., vertically between, the electrode assembly 10 and a bottom of the case 15.

For example, the safety member 240 may include a plate portion 241 and a pair of protrusions 242 and 243, e.g., protruding therefrom. The protrusions 242 and 243 may respectively protrude upwardly and downwardly from the plate portion 241 to be connected to, e.g., electrically connected to, the first sub-resistance members 245 and 246.

The first sub-resistance members 245 and 246 of the present embodiment may set various or different resistances, as compared with the first resistance member 45. Accordingly, the first sub-resistance members 245 and 246 may set various or different current values between the negative electrode 11 of the electrode assembly 10 and the plate portion 241. For example, the first sub-resistance members 245 and 246 may disperse current paths between the negative electrode 11 of the electrode assembly 10 and the plate portion 241.

Figure 7:
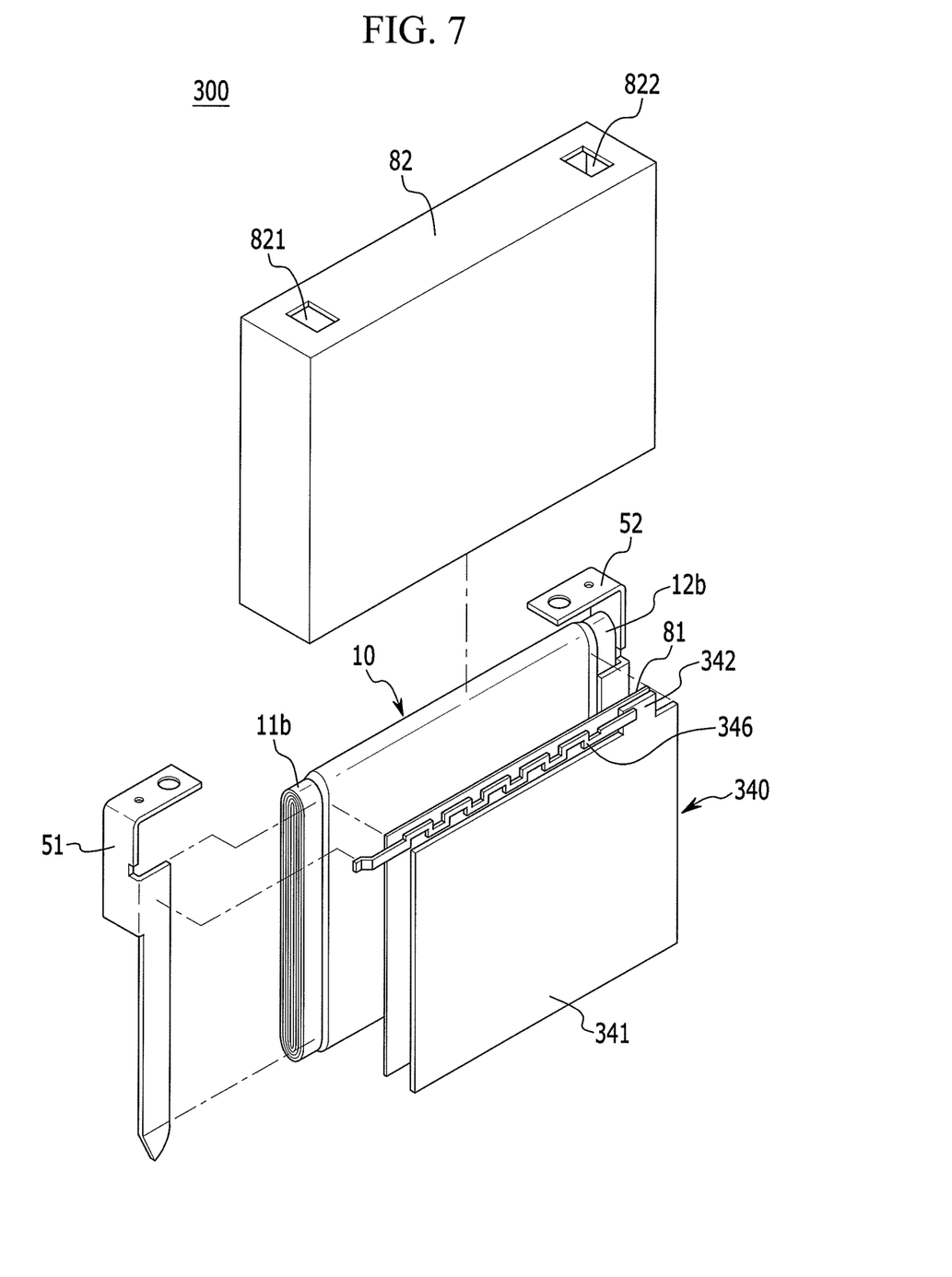
FIG. 7 illustrates an exploded perspective view showing an electrode assembly, first and second insulation members, a safety member, and positive and negative electrode lead tabs in a rechargeable battery in accordance with a third exemplary embodiment.

FIG. 7 illustrates an exploded perspective view showing an electrode assembly 10, first and second insulation members 81 and 82, a safety member 340, and positive and negative electrode lead tabs 51 and 52 in a rechargeable battery 300 in accordance with a third exemplary embodiment.

Referring to FIG. 7, in the rechargeable battery 300 of the third exemplary embodiment, a first resistance member 346 may have a bent shape, and may be disposed separately from, e.g., a separate piece from or spaced apart from, a plate portion 341 to have a first end thereof connected to, e.g., electrically connected to, a protrusion 342 and a second end thereof connected to, e.g., electrically connected to, the negative electrode lead tab 51 (that is electrically connected to the uncoated region 11b of the negative electrode 11). For example, the first resistance member 346 may set a resistance between the electrode assembly 10 and the cap plate 20 and may also set a relevant current value.

The first resistance member 346 may have a staggered, bent shape, and thus may have a longer length due to the bent shape, when compared with a length of the first resistance member 45 (of the first exemplary embodiment). Accordingly, the first resistance member 346 may more precisely set the resistance, as compared with the first resistance member 45 of the first exemplary embodiment. For example, the first resistance member 346 may more precisely set a current value between the electrode assembly 10 and the cap plate 20.

By way of summation and review, the rechargeable battery may include an electrode assembly having a separator and a positive electrode and a negative electrode on opposite surfaces of the separator, a case for accommodating the electrode assembly therein, a cap plate for sealing an opening of the case, and a positive electrode terminal and a negative electrode terminal installed in the cap plate to extend therethrough and electrically connected to the electrode assembly.

For example, when the positive electrode terminal is electrically connected to the cap plate, the cap plate and the case may be positively electrified. If a conductor were to penetrate the case of the rechargeable battery and prick the electrode assembly, a high-voltage current flowing through the positive electrode terminal may flow again to the electrode assembly via the cap plate, the case, and the conductor.

A rechargeable battery may include a safety member between the electrode assembly and the case to accomplish safety against penetration of a conductor, and may negatively electrify the safety member. Accordingly, the conductor (that penetrates the positively electrified case) may come into contact with the negatively electrified safety member. As a result, a current charged in the electrode assembly may be discharged in the case and the safety member through the conductor, thereby reducing the likelihood of and/or preventing ignition and explosion of the electrode assembly.

In this case, the positive electrode may be directly connected to the cap plate, it may be difficult to set a resistance between the cap plate and the positive electrode terminal for positively electrifying the cap plate and the case, and it may also be difficult to set a relevant current value. Further, the safety member may be directly connected to the negative electrode of the electrode assembly, it may be difficult to set a resistance between the safety member and the negative electrode of the electrode assembly for negatively electrifying the safety member, and it may also be difficult to set a relevant current value.

The embodiments may provide a rechargeable battery having advantages of setting a resistance between a negative electrode of an electrode assembly and a safety member and also setting a relevant current value while positively electrifying a cap plate and a case and negatively electrifying the safety member.

The embodiments may provide a rechargeable battery having advantages of setting a resistance between a cap plate and a positive electrode terminal for positively electrifying the cap plate and a case and also setting a relevant current value.

In accordance with an embodiment, it is possible to provide a rechargeable battery having an effect of setting a resistance between a negative electrode of an electrode assembly and a safety member and thus setting a relevant current value between the negative electrode and the safety member while positively electrifying a cap plate and a case and negatively electrifying the safety member.

The embodiments may provide a rechargeable battery including a safety device that compensates for issues that may arise due to penetration of a conductor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

| <Description of Symbols> | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21: negative electrode terminal | 21a, 22a: rivet terminal |
| 21b, 22b: flange | 21c, 22c: plate terminal |
| 22d: connection portion | 24: vent hole |
| 25: vent plate | 25a: notch |
| 27: sealing cap | 29: electrolyte injection opening |
| 31, 32: insulation member | |
| 36, 37: negative, positive electrode gasket | |
| 40, 240, 340: safety member | 41, 241, 341: plate portion |
| 42, 242, 243, 342: protrusion | 45, 245, 246, 346: first resistance member |
| 46: second resistance member | |
| 51, 52: negative, positive electrode lead tab | |
| 61, 62: negative, positive electrode insulation member | |
| 81, 82: first, second insulation member | |
| 100, 200, 300: rechargeable battery | 461, 462: through hole |
| 463, 464: first, second mounting member | 465, 466: nut |
| 821, 822: outlet | H1, H2: terminal hole |
| N: conductor | |

What is claimed is:

1. A rechargeable battery, comprising:
an electrode assembly including a separator, and a negative electrode and a positive electrode provided on opposite surfaces of the separator;
a case accommodating the electrode assembly therein;
a cap plate coupled to the case;
a negative electrode terminal and a positive electrode terminal respectively connected to the negative electrode and the positive electrode, the negative electrode terminal and positive electrode terminal extending through a terminal hole of the cap plate;
a safety member between the electrode assembly and the case;
a first resistance member connecting the safety member with the negative electrode; and
an insulation member,
wherein the safety member includes:
a plate portion on a flat side surface of the electrode assembly, the insulation member being on the plate portion, and
a protrusion that protrudes from the plate portion and is electrically connected to the first resistance member, the protrusion protruding from the plate portion at a region that is closer to the positive electrode terminal than the negative electrode terminal.

2. The rechargeable battery as claimed in claim 1, wherein the first resistance member has a band shape and is spaced apart from the plate portion, a first end of the first resistance member being connected to the protrusion and a second end of the first resistance member being connected to a negative electrode lead tab that is connected to the negative electrode.

3. The rechargeable battery as claimed in claim 2, wherein the first resistance member is vertically between the electrode assembly and the cap plate.

4. The rechargeable battery as claimed in claim 2, wherein the first resistance member includes a pair of first sub-resistance members, one of the first sub-resistance members being vertically between the electrode assembly and the cap plate, and the other of the first sub-resistance members being vertically between the electrode assembly and a bottom of the case.

5. The rechargeable battery as claimed in claim 4, wherein the safety member includes a pair of the protrusions, one of the protrusions protruding upwardly from the plate portion and being connected to the one of the pair of first sub-resistance members, and the other of the protrusions protruding downwardly from the plate portion and being connected to the other of the pair of first sub-resistance members.

6. The rechargeable battery as claimed in claim 1, wherein the first resistance member:
has a bent shape,
is separate from the plate portion, and
has a first end connected to the protrusion and a second end connected to a negative electrode lead tab, the negative electrode lead tab being connected to the negative electrode.

7. The rechargeable battery as claimed in claim 1, further comprising a second resistance member connecting the positive electrode terminal with the cap plate.

8. The rechargeable battery as claimed in claim 7, wherein the positive electrode terminal includes:
a rivet terminal in the terminal hole of the cap plate;
a widely-formed flange inside the cap plate and integrated with the rivet terminal; and a plate terminal outside of and insulated from the cap plate, the plate terminal being electrically connected to the rivet terminal.

9. The rechargeable battery as claimed in claim 8, wherein the plate terminal includes:
   a through hole into which the rivet terminal is inserted, and
   a connection portion protruding from a side thereof, the connection portion being connected to the second resistance member.

10. The rechargeable battery as claimed in claim 9, wherein:
    the second resistance member has a plate shape and includes a pair of through holes at opposite sides thereof,
    a first mounting member protrudes from the connection portion through a first one of the through holes, and
    a second mounting member protrudes from the cap plate through a second one of the through holes.

11. The rechargeable battery as claimed in claim 10, wherein each of the first mounting member and the second mounting member has threads at an end portion thereof, the second resistance member being mounted on the first mounting member and the second mounting member and being fastened to the first mounting member and the second mounting member by a nut.

12. A rechargeable battery, comprising:
    an electrode assembly including a separator, and a negative electrode and a positive electrode provided on opposite surfaces of the separator;
    a case accommodating the electrode assembly therein;
    a cap plate coupled to the case;
    a negative electrode terminal and a positive electrode terminal respectively connected to the negative electrode and the positive electrode, the negative electrode terminal and positive electrode terminal extending through a terminal hole of the cap plate;
    a safety member between the electrode assembly and the case;
    a first resistance member connecting the safety member with the negative electrode; and
    an insulation member;
    wherein the safety member includes:
      a plate portion on a flat side surface of the electrode assembly, the insulation member being on the plate portion, and
      a protrusion that protrudes from the plate portion and is connected to the first resistance member,
    wherein the first resistance member has a band shape and is spaced apart from the plate portion, a first end of the first resistance member being connected to the protrusion and a second end of the first resistance member being connected to a negative electrode lead tab that is connected to the negative electrode,
    wherein the first resistance member includes a pair of first sub-resistance members, one of the first sub-resistance members being vertically between the electrode assembly and the cap plate, and the other of the first sub-resistance members being vertically between the electrode assembly and a bottom of the case, and
    wherein the safety member includes a pair of the protrusions, one of the protrusions protruding upwardly from the plate portion and being connected to the one of the pair of first sub-resistance members, and the other of the protrusions protruding downwardly from the plate portion and being connected to the other of the pair of first sub-resistance members.

13. A rechargeable battery, comprising:
    an electrode assembly including a separator, and a negative electrode and a positive electrode provided on opposite surfaces of the separator;
    a case accommodating the electrode assembly therein;
    a cap plate coupled to the case;
    a negative electrode terminal and a positive electrode terminal respectively connected to the negative electrode and the positive electrode, the negative electrode terminal and positive electrode terminal extending through a terminal hole of the cap plate;
    a safety member between the electrode assembly and the case;
    a first resistance member connecting the safety member with the negative electrode; and
    a second resistance member connecting the positive electrode terminal with the cap plate,
    wherein the positive electrode terminal includes:
      a rivet terminal in the terminal hole of the cap plate;
      a widely-formed flange inside the cap plate and integrated with the rivet terminal; and
      a plate terminal outside of and insulated from the cap plate, the plate terminal being electrically connected to the rivet terminal,
    wherein the plate terminal includes:
      a through hole into which the rivet terminal is inserted, and
      a connection portion protruding from a side thereof, the connection portion being connected to the second resistance member, and
    wherein:
      the second resistance member has a plate shape and includes a pair of through holes at opposite sides thereof,
      a first mounting member protrudes from the connection portion through a first one of the through holes, and
      a second mounting member protrudes from the cap plate through a second one of the through holes.

\* \* \* \* \*